US012369029B2

(12) United States Patent
Smith et al.

(10) Patent No.: US 12,369,029 B2
(45) Date of Patent: *Jul. 22, 2025

(54) DYNAMIC ACCESS POLICY PROVISIONING IN A DEVICE FOG

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/670,915

(22) Filed: Feb. 14, 2022

(65) Prior Publication Data

US 2022/0248226 A1 Aug. 4, 2022

Related U.S. Application Data

(63) Continuation of application No. 16/610,835, filed as application No. PCT/US2018/032465 on May 11, 2018, now Pat. No. 11,284,259.

(Continued)

(51) Int. Cl.
*H04L 29/06* (2006.01)
*G06F 21/62* (2013.01)
(Continued)

(52) U.S. Cl.
CPC ........ *H04W 12/08* (2013.01); *G06F 21/6218* (2013.01); *H04L 41/0893* (2013.01);
(Continued)

(58) Field of Classification Search
None
See application file for complete search history.

(56) References Cited

U.S. PATENT DOCUMENTS 11,284,259 B2   3/2022   Smith et al.
2005/0262132 A1*  11/2005  Morita ............... G06F 21/6218
                                                  707/999.102

(Continued)

FOREIGN PATENT DOCUMENTS

WO   2018209323   11/2018

OTHER PUBLICATIONS

Patent Cooperation Treaty, "International Preliminary Report on Patentability," issued in connection with International Application Serial No. PCT US2018 032465, dated Nov. 21, 2019, 10 pages.

(Continued)

*Primary Examiner* — Shin-Hon (Eric) Chen
(74) *Attorney, Agent, or Firm* — HANLEY, FLIGHT & ZIMMERMAN, LLC

(57) ABSTRACT

Various systems and methods for dynamic access policy provisioning in a connected device framework are described herein. In an example, the techniques for policy provisioning may include resource update access policy automation, directory resource access policy automation, or hidden resources access policy automation, as monitored and operated with an access management service (AMS). In an example, the AMS monitors resources to receive a notification when they change. If the change observed is an addition or deletion of a resource object, the AMS responds by performing security analysis of devices hosting the new resource(s), which may further result in device onboarding actions. The AMS may further respond by evaluating link semantics to determine which other devices and resources may need updated access control list (ACL) policies.

25 Claims, 9 Drawing Sheets

Related U.S. Application Data

(60) Provisional application No. 62/505,643, filed on May 12, 2017.

(51) Int. Cl.

| | | |
|---|---|---|
| *H04L 9/40* | (2022.01) | |
| *H04L 41/0893* | (2022.01) | |
| *H04W 4/38* | (2018.01) | |
| *H04W 12/08* | (2021.01) | |
| *H04L 41/0894* | (2022.01) | |

(52) U.S. Cl.
CPC ............ *H04L 63/102* (2013.01); *H04L 63/20* (2013.01); *H04W 4/38* (2018.02); *H04L 41/0894* (2022.05)

(56) References Cited

U.S. PATENT DOCUMENTS

| | | | | |
|---|---|---|---|---|
| 2014/0359131 | A1* | 12/2014 | Seed | H04L 67/1031 |
| | | | | 709/226 |
| 2015/0019714 | A1* | 1/2015 | Shaashua | H04W 4/023 |
| | | | | 709/224 |
| 2016/0105305 | A1* | 4/2016 | Pignataro | H04L 41/0893 |
| | | | | 709/223 |
| 2016/0212099 | A1* | 7/2016 | Zou | H04L 63/1408 |
| 2016/0337144 | A1* | 11/2016 | Kim | H04L 12/2816 |
| 2016/0366136 | A1* | 12/2016 | Heldt-Sheller | H04L 63/101 |
| 2016/0366183 | A1* | 12/2016 | Smith | H04L 63/06 |
| 2017/0006528 | A1* | 1/2017 | Bari | H04W 4/00 |
| 2017/0093915 | A1* | 3/2017 | Ellis | H04L 63/04 |
| 2017/0295181 | A1* | 10/2017 | Parimi | H04L 63/1433 |
| 2018/0212768 | A1* | 7/2018 | Kawashima | H04L 63/0876 |
| 2018/0225354 | A1* | 8/2018 | Li | G06F 16/283 |
| 2018/0270314 | A1* | 9/2018 | Mladin | H04L 67/60 |
| 2018/0316563 | A1* | 11/2018 | Kumar | H04W 12/102 |
| 2019/0288913 | A1* | 9/2019 | Salgueiro | H04L 41/082 |
| 2020/0137119 | A1* | 4/2020 | Jin | H04L 63/20 |

OTHER PUBLICATIONS

Patent Cooperation Treaty, "International Search Report," issued in connection with International Application Serial No. PCT/US2018/032465, dated Aug. 30, 2018, 6 pages.

Patent Cooperation Treaty, "Written Opinion," issued in connection withInternational Application Serial No. PCT/US2018/032465, dated Aug. 30, 2018, 8 pages.

Hartke, Universitaet Bremen Tzi, "Observing Resources in the Constrained Application Protocol (CoAP) rfc7641.txt", Observing Resources in the Constrained Application Protocol COAP rfc7641.txt Internet Engineering Task Force IETF Standard Internet Society ISOC Rue Des Falaises CH—1205 Geneva Switzerland, (Oct. 1, 2015), 1-30.

"OCF Security Specification V1.0.0", Open Connectivity Foundation (OCF), [Online] Retrieved from the internet:https://openconnectivity.org draftspecs OCF_Security_Specification_v1.0.0.pdf, (Mar. 22, 2017), 104 pgs.

"OCF Core Specfication V1.0.0 Part 1", Open Connectivity Foundation (OCF), (Mar. 22, 2017), 175 pgs.

United States Patent and Trademark Office, "Notice of Allowance and Fee(s) Due," issued in connection with U.S. Appl. No. 16/610,835, dated Nov. 12, 2021, 15 pages.

Mobile Edge Computing Introductory Technical White Paper, Sep. 1, 2014 (Sep. 1, 2014), 36 pages.

* cited by examiner

DYNAMIC ACCESS POLICY PROVISIONING IN A DEVICE FOG

PRIORITY CLAIM

This application is a continuation of U.S. patent application Ser. No. 16/610,835, filed Nov. 4, 2019, which is a U.S. National Stage Application under 35 U.S.C. 371 from International Application No. PCT/US2018/032465, filed May 11, 2018, published as WO 2018/209323, which claims the benefit of priority to U.S. Application Ser. No. 62/505,643, filed May 12, 2017, all of which are incorporated herein by reference in their entirety.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF) or the European Telecommunications Standards Institute (ETSI) Multi-access Edge Computing (MEC) standards group.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
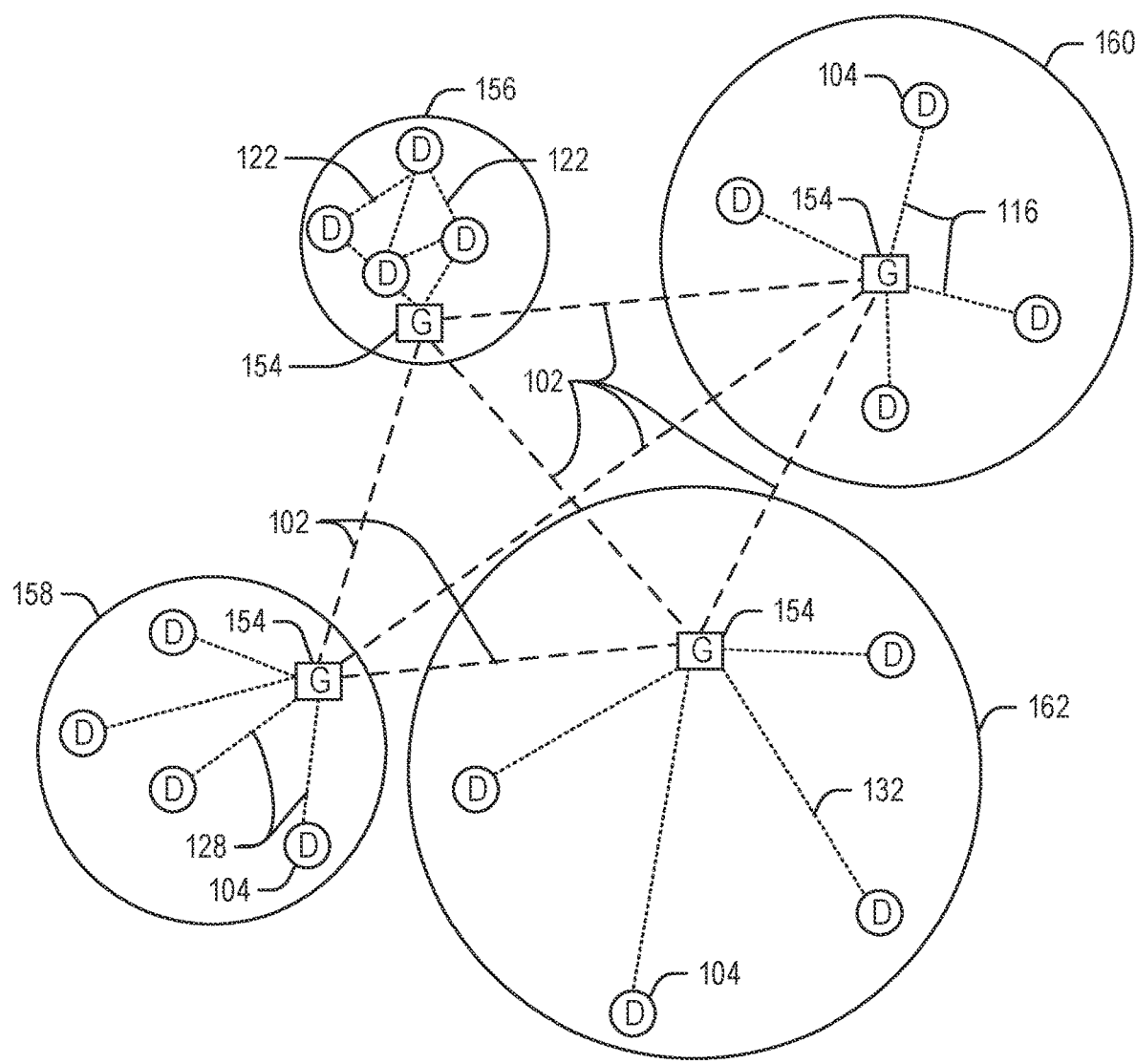
FIG. 1 illustrates a domain topology for respective internet-of-things (IoT) networks coupled through links to respective gateways, according to an example.

In the following description, methods, configurations, and related apparatuses are disclosed for device connection and operation in an IoT device interconnection setting through the use of dynamic access policy provisioning techniques. These provisioning techniques may be applicable to networks and systems of devices such as in implementations of Open Connectivity Foundation (OCF) standard-based networks and devices (including fog implementations, for a network of devices operating as a fog). The following provisioning techniques may be applicable to other implementations of IoT standards and systems promulgated by ETSI Multi-Access Edge Computing (MEC), Internet Engineering Task Force (IETF), W3C Web of Things, oneM2M, OPC Foundation, Open Mobile Alliance, among others.

As an example, OCF standard-based networks may include a variety of devices containing "resources" that describe device behavior and interoperation. These resources follow a declarative style and largely use RESTful protocol interactions to perform network operations. In existing implementations, secure operation of an OCF device fog to use such resources and network operations depends on a priori provisioning of access control policies. Device definition often occurs early in the lifecycle of a device fog, such as in cases where a device OEM defines and embeds the resource definition before the device is shipped to a customer. However, the other devices that may interact with the device's resources are not known a priori; as a result, access policies largely cannot be statically provisioned.

Device onboarding techniques may be used to reveal a new device to the fog network, providing the onboarding tools with the opportunity to provision access policies for a device. The onboarding tools, however, are not involved to modify access policies except when devices are added or removed. This is because resources are not created or deleted, they are only updated or read. Nevertheless, the OCF resource model anticipates dynamic resource creation and deletion, but by convention and for pragmatic reasons resource creation and deletion are not practiced subsequent to device onboarding/offboarding. In anticipation of increased dynamism in IoT device networks and fog implementations, a gap exists, because many access policies must be updated to reflect piecemeal addition or deletion of a resource.

As discussed herein, the following techniques apply dynamic access policy provisioning techniques that use a distributed computing "observe" pattern applied to automate the creation and updating of access policies for directory resources, collection resources, and even hidden resources. An access management service (AMS) monitors these classes, performs security analysis of devices hosting the new resource(s), and evaluates link semantics to determine which other devices and resources may need updated ACL policies.

In an example, consider a scenario in which an onboarding tool (an "OBT", e.g., provided by the Device Owner Transfer Service (DOTS)) introduces a new device (which may host additional resource instances) into an IoT network. The introduction of new resources exposes a gap in security policy where existing ACL deployments may not comprehend the newly added resources. The security policy may (fortuitously) accommodate the new resources due to wildcard matching logic. However, the access rights granted may not be appropriate or specific to the use case or deployment context, resulting in a need for security administrative review if not re-provisioning. With the following techniques, the addition of resources in the network may result in dynamic provisioning of ACE policies on the new device as well as on existing devices.

Also in an example, the following techniques address an overlooked aspect of Collection resources where Collection resources act as a directory that redirects access to a different resource (e.g., using 'batch' interface semantics). This results in an ACE policy that is applied to the first hop access (e.g., a first device, Device A) where the collection resource overrides the ACE policy applied to the redirected resources (e.g., Devices B/C/D). (The redirected resource, e.g., Resource1 on Device B may have an ACE that permits the collection resource to access the resource, while denying access to Device A). With the following techniques, a notification may be provided to an AMS (or other sentinel device) whenever batch redirected access overrides the local ACE of the end-devices. Specifically, an OBSERVE command (e.g., illustrated in FIG. 3, discussed below) that is created on a link may be used to report 'override' behavior. This is in addition to an OBSERVE command that detects the addition of a link in response to an onboarding event that introduced the new device or new resource into the network.

Various references are provided in the following disclosure to an "IoT network" and a "IoT device network". It will be understood that such a network is not limited to the connection of devices expressly labeled as usable in the "internet of things"; rather, an IoT network may include, encompass, or be integrated with various aspects of an edge device network, edge computing network, fog network, mesh network, intermediate network, local or wide area network, connectivity access network, or media networks, in a variety of interconnected or segmented topologies, infrastructure, or arrangements that enable devices, services, resources, and other components to communicate with each other to accomplish various objectives. The following discussion is provided as examples of domain topologies for connectivity of devices in cloud, fog (intermediate), and edge settings; it will be understood that labels such as "IoT", "cloud", "fog", and "edge" are provided for purposes of explanation and are not necessarily limiting or definitional.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
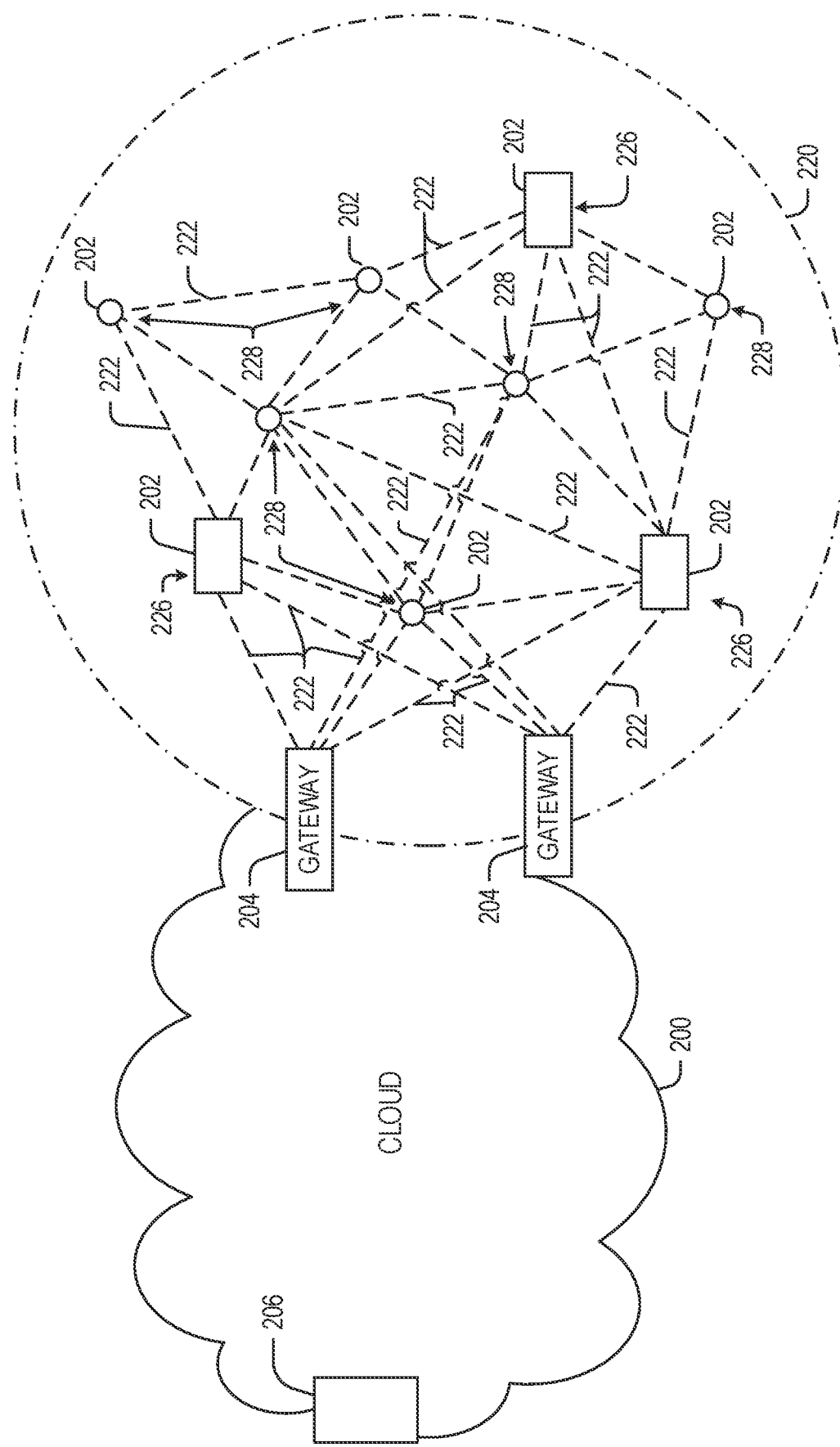
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider)

using any number of communications links, such as an LTE cellular link, an LPWA link, or a link based on the IEEE 802.15.4 standard, such as ZigBee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 7 and 8.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

The techniques discussed herein may be applicable to these and other network configurations. In an example, a distributed computing 'observe' pattern is applied to directory resources, collection resources, or hidden resources, in an IoT network or fog scenario. In a further example, an access management service (AMS) (or, other aspects of a device owner transfer service (DOTS) or onboarding tool (OBT)) monitors these classes of resources to receive a notification when the resources change. If the change observed is an addition or deletion of a resource object, the AMS responds by performing security analysis of devices hosting the new resource(s), which may further result in device onboarding actions. The AMS further responds by evaluating link semantics to determine which other devices and resources may need updated ACL policies.

With the presently described techniques, IoT device networks and fog implementations may achieve a higher degree of dynamism while preserving equivalent safe and secure operation of the current but less dynamic operational capability. Much, if not all, of the access policy provisioning overhead may be automated, resulting in significant operational cost savings over existing approaches. In contrast, other access systems such as single sign-on approaches (e.g., the OAuth2 single-sign-on system) centralize access, requiring a "user" to "login" to the central server at which a token is issued. While such approaches may grant user access to one or more servers and may include role or attribute constraints, such approaches do not comprehend access at the resource level and do not comprehend specific device-to-device interaction semantics. Likewise, centralized approaches also suffer from the access service provider being a central point of attack and failure, which may add risk to safe distributed fog operation.

Additionally, existing approaches that are currently involved by the current version of the OCF Specification, while safer than truly dynamic centralized approaches, do not fully accommodate resource and access policy dynamism. With existing OCF approaches, devices must undergo a software update and be re-onboarded in order to create or delete a resource. The onboarding event triggers access policy provisioning behavior that then may cascade throughout the fog of devices before processing on the new/updated device will resume. These and other technical limitations are addressed using the dynamic access policy provisioning techniques discussed herein.

Figure 3:
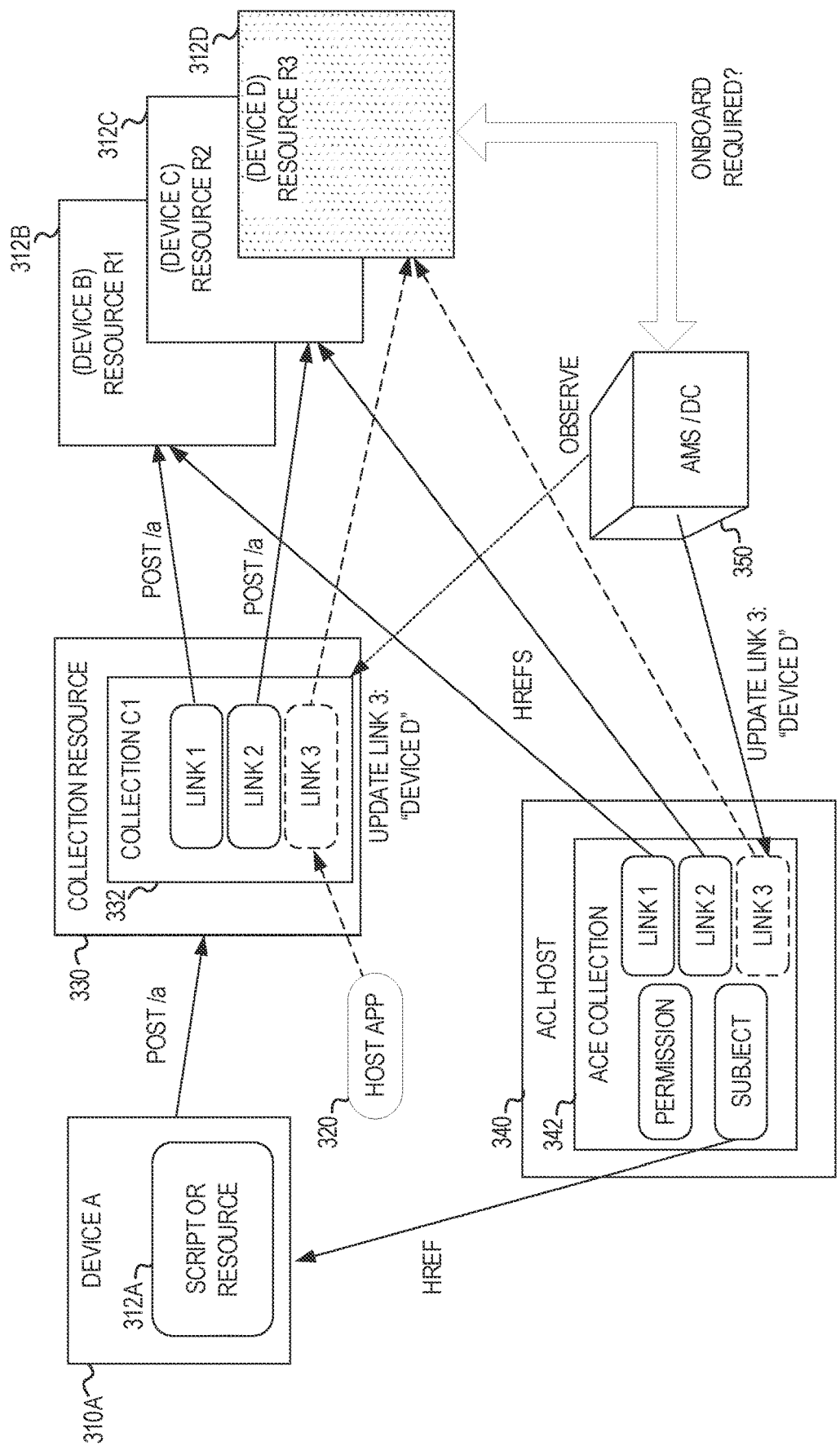
FIG. 3 illustrates a block diagram of system operations involving access policy automation for dynamic addition of a resource in a fog of devices, according to an example.

FIG. 3 illustrates a block diagram of example system operations involving access policy automation for dynamic addition of a resource into the access control policies used for a fog of devices. As illustrated in FIG. 3, a 'host app' 320 performs an UPDATE operation on a collection resource 332 (hosted by collection host device 330), to establish a reference to a Device D that hosts a new Resource R3 312D. Other resources R1 312B (hosted by Device B) and R2 312C (hosted by Device C) have existing links established from the collection resource 332.

In this UPDATE operation example, the AMS 350 observes the update and performs security functions on the hosting device (Device D). In this example, such security functions may include one or more of: device onboarding, attestation, software (SW) update, security scans, or provisioning to bring the device to a similar security level as its peer devices.

Also in this UPDATE operation example, the AMS 350 further provisions access control entity (ACE) policies associated with the expected semantics of the referring linkage. In many cases, the type structure of resources may be used to automate construction of ACE policies (e.g., maintained by an ACL Host 340) that permit access so long as the typing mechanism authorizes. As shown, the AMS 350 updates an ACE collection 342 within the ACL Host 340 to include an ACE entry or definition for the reference (Link 3). The ACE collection 342 may already include ACE entries or definitions for the existing resources in the network (such as an entry or definition for the reference to Resource R2 312C via Link 2, or for the reference to Resource R1 312B via Link 1).

In another example, the operations depicted in FIG. 3 may be applied in a similar fashion with the automation of directory resources. Directory resources are a type of resource that manages, existentially, other resources. An array property in a directory resource containing a reference to another resource presents the illusion that the referenced resource exists (or doesn't exist) based exclusively on the directory resource view. In a further example, the AMS 350 may operate to observe the directory resource and apply an access policy consistent with the directory's view of the device fog. Because no access is permitted to a resource in an OCF network without an ACE entry permitting access, the referenced resource is effectively removed from the fog as a result of the application of this access policy. Further, by enforcing a convention that all devices cannot publish absolute references to resources, directory resources become an effective technique for implementing CREATE and DELETE semantics. This allows management through directory resources, even though actual creation and deletion of resources never occurs.

Further, it should be noted that CRUDN CREATE and DELETE functionality may be implemented in some examples using UPDATE, such as where a collection resource that is a directory of all known resources is modified to add or remove a link entry. Such a link may refer to an actual resource that the Server may create or delete in coordination with the update event, or where the Server may simply expose/hide the resource in response to the update event. With the present techniques, the permissions controlling CREATE/DELETE in an ACE should apply to the above case that appears to allow/deny based on UPDATE permissions in the ACE. Such confusion is avoided with the present techniques by recognizing that resource directories (e.g., collection resources) involving link structures to resources are required to match CREATE/DELETE ACE permissions instead of matching them to UPDATE permissions.

Figure 4:
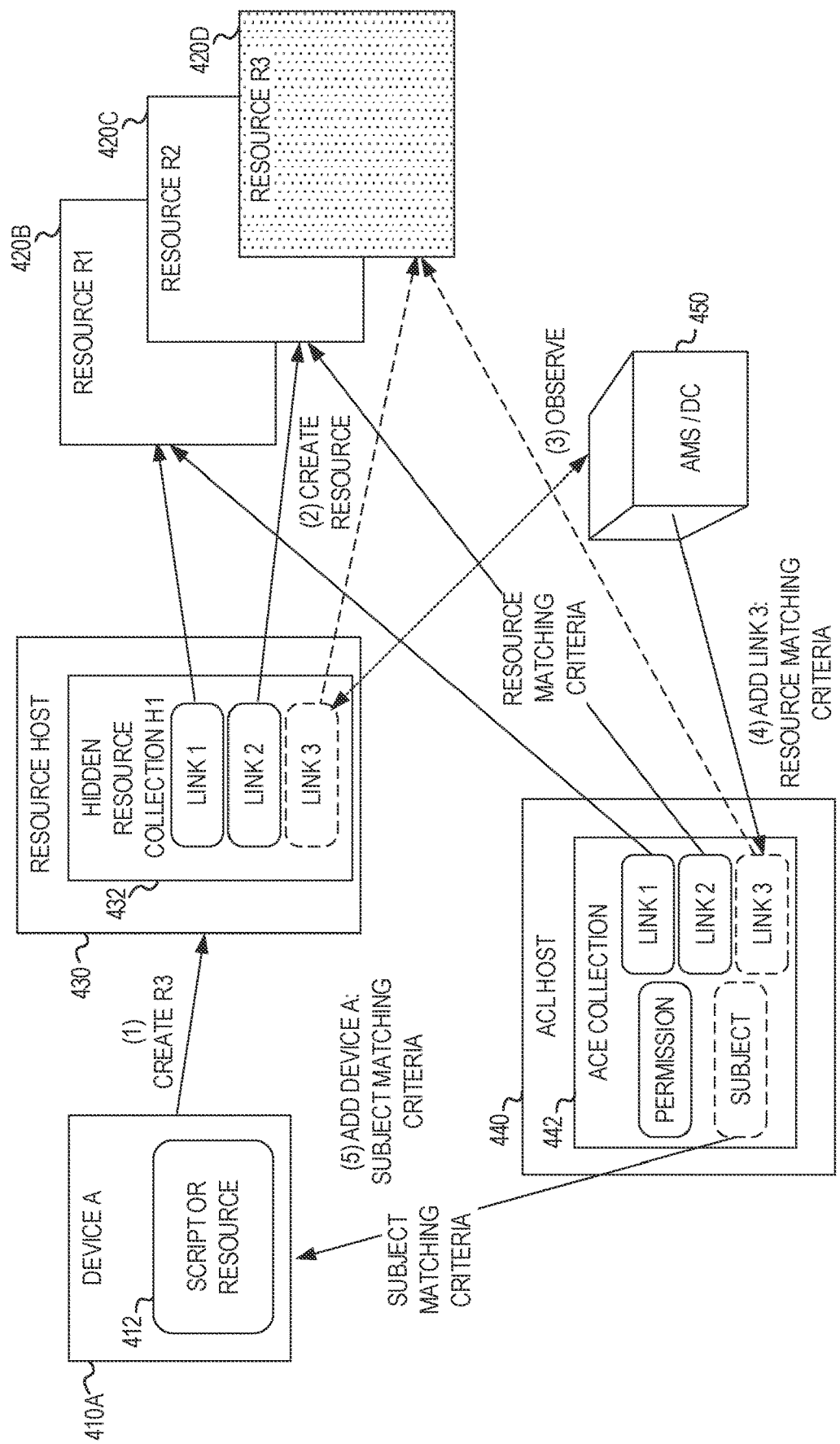
FIG. 4 illustrates a block diagram of system operations involving access policy automation for dynamic addition of a hidden resource in a fog of devices, according to an example.

FIG. 4 illustrates a block diagram of example system operations involving access policy automation for dynamic addition of a hidden resource into the access control policies used for a fog of devices. In this example, the AMS 450 considers hidden collection resources that are implicitly accessed when a CREATE or DELETE command is received by an OCF device to modify a hidden resource.

Referring to the example of FIG. 4, the originating device (e.g., device 410A, operating a script or resource 412) acts as the "host app" responsible for delivering the CREATE or DELETE command to modify the hidden resource collection 432 at a resource host 430 (indicated in operation (1)). The use of a CREATE command, for instance, results in the creation of a new resource R3 420D (indicated in operation (2)), to add the resource to the collection 432 in addition to resource R1 420B and resource R2 420C. The use of a CREATE command assumes a use case where the Device A 410A has a policy permitting CREATE of resources of type R3. The AMS 450 operates to observe the hidden collection updates, to detect resource creation and deletion semantics. As shown, the CREATE or DELETE command, implemented into the hidden resource 432, is observed on the network by the AMS 450 (indicated in operation (3)) through use of the OBSERVE command.

With the OBSERVE command, the AMS 450 is notified when a change to the hidden resource is anticipated and responds by evaluating the access policy environment (e.g., using the techniques discussed above with reference to the examples of resource update automation, or directory resource automation), as already described. The AMS 450 automatically responds by updating the resource host ACL policy. This is shown in FIG. 4 with the addition of Link 3 to an ACE collection 442 stored at an ACL host 440 (operation (4)), through use of resource matching criteria. The ACE structure, in some examples, may be implemented as an array (rather than as a collection—though additionally, a collection may be implemented as an array).

In a further example, the AMS 450 (and/or a hidden resource host, such as the host 430) may also transition a device state as appropriate to block access to other resources and to perform access policy provisioning.

Also in a further example, subject matching criteria may be used to map the subject of the ACE entry to the source device. In the scenario of FIG. 4, this enables the addition of a reference (href) to add device A 410A in a subject of the ACE collection 442 (operation (5)). Accordingly, the subject (e.g., in collection entry 442) may be one of wildcard matching, href, or role; likewise, the link (e.g., in collection entry 442) may be a 'resource matching' criteria that may be multiple of: wildcard, href, or rt (resource type) or other attributes found in a Collection resource "link" structure.

In this example, the AMS 450 may apply a type enforcement strategy where the device and/or resource type of Device A 410 (as the intended accessor of R3) will consider the resource type of R3. For example, the AMS 450 may perform a type-safe analysis, and determine an access control entry permitting Device A with READ, UPDATE, DELETE, NOTIFY or other operations as authorized by the type-safety policy.

Figure 5:
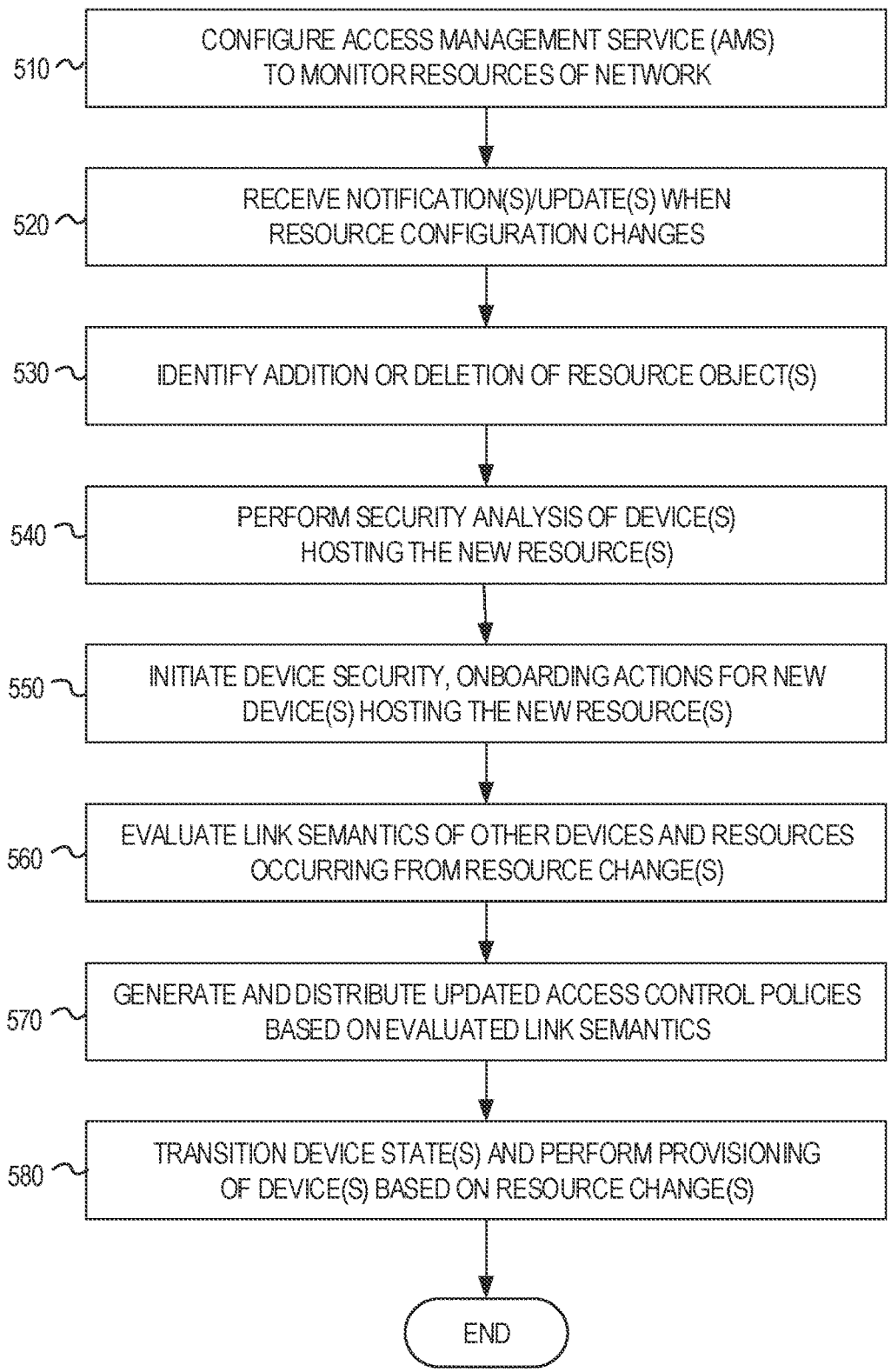
FIG. 5 illustrates a flowchart of an example technique performed with an access management service for dynamic access policy provisioning in a fog of devices, according to an example.

FIG. 5 illustrates a flowchart 500 of an example technique performed with an access management service for dynamic access policy provisioning in a fog of devices. As shown, the operations of the flowchart 500 are depicted as sequential; in other examples, the operations of the flowchart 500 may be performed in another order or with additional (or fewer) operations.

As shown, the operations of the flowchart 500 include the configuration of an access management service (AMS) to monitor the resources of the network (operation 510), and to receive notifications or updates when the resource configuration of the network changes (operation 520). The network changes may include an UPDATE operation on a collection resource (collection resource changes), changes as recorded in directory resources (directory changes), or observed hidden collection updates (hidden collection changes), in accordance with the techniques described above. Based on these notifications or updates, the AMS operates to identify additions or deletions of resource objects within the device network or fog (operation 530).

The operations of the flowchart 500 continue with the AMS performing a security analysis of the one or more devices that are hosting the new resource(s) changed on the network (operation 540). In response to this security analysis, various device security and onboarding actions may be performed upon the hosting device(s) (e.g., the device(s) hosting the new resources changed on the network) (operation 550). As discussed above, these security operations may include onboarding, attestation, software update, or other security scans or provisioning (e.g., to bring the new device to a similar security level as its peer devices).

Additional security configuration may be performed by the access management service, including the evaluation of link semantics with the other devices and resources, changing as a result of the resource change(s) (operation 560), and the generation and distribution of updated access control policies to the respective devices and resources based on the evaluated link semantics (operation 570). Finally, the AMS (and/or a hidden resource host) transitions the device states of the various device(s), as appropriate, to block access to other resources and to perform access policy provisioning, based on the identified resource change(s) (operation 580).

Figure 6:
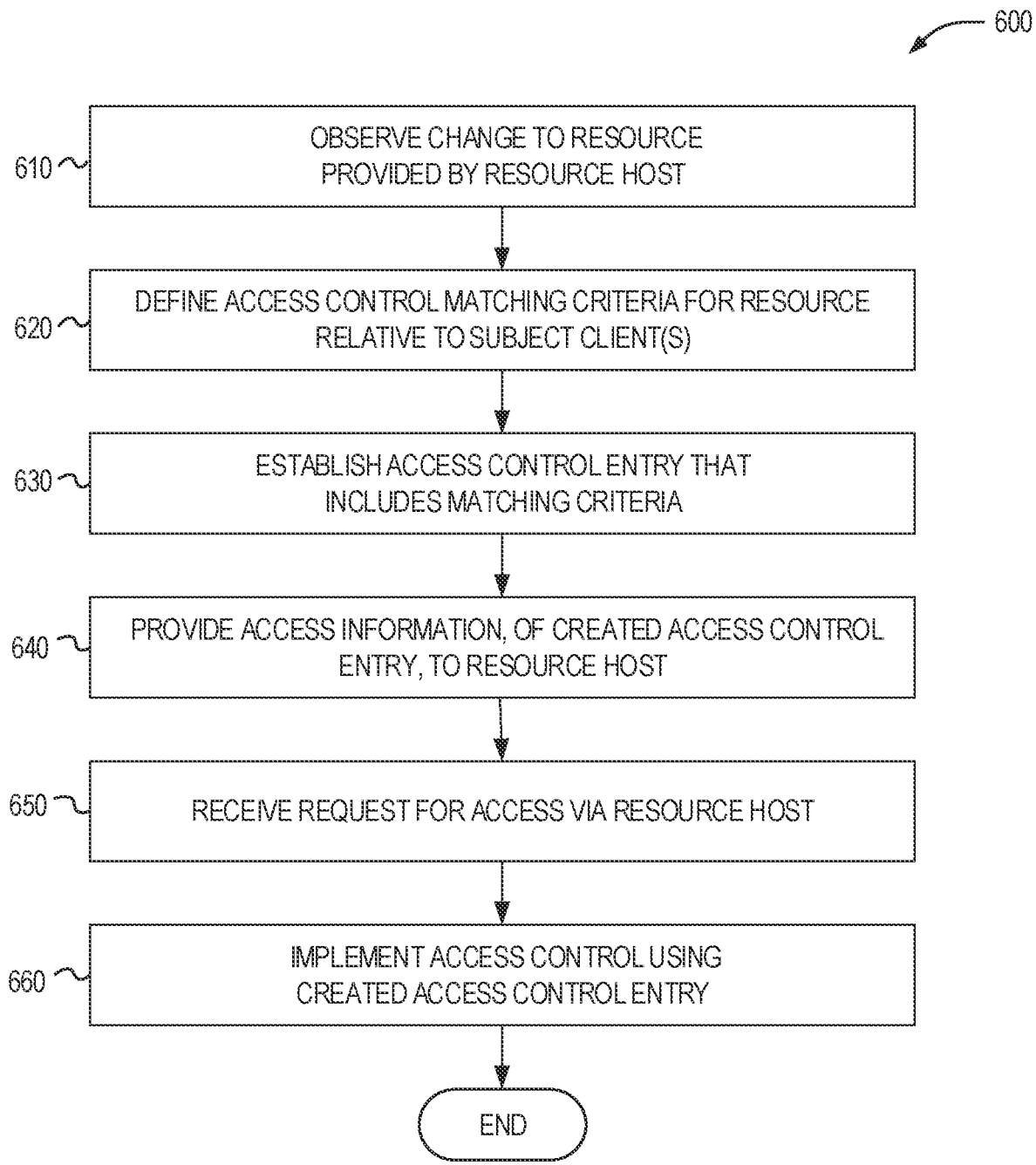
FIG. 6 illustrates a flowchart of an example technique for generating automated access policy changes for resources created in an IoT network, according to an example.

FIG. 6 illustrates a flowchart 600 of an example technique for generating automated access policy changes for resources in an IoT network.

The following operations are depicted from the perspective of an access management service or other intermediate IoT device or system which manages access control policies and characteristics. However, it will be understood that the techniques of flowchart 600 may be further adapted from the perspective of a client-side device, server-side device, or systems involving both client, server, and intermediate entities.

The flowchart 600 begins with the observation of a change to a resource provided by a resource host (operation 610), such as with the techniques and scenarios discussed above. Specifically, this change of the resource modifies availability to the resource within an Internet of Things (IoT) network. In certain examples, the resource is a hidden resource, and the hidden resource is identified in response to a create or delete command (or, an equivalent of a create or delete command, such as by an update to a collection resource) performed with the resource in the IoT network. For instance, the observed change to the resource may be identified from a change to a hidden resource or collection hosted by the resource host. Also in certain examples, the observed change to the resource is a creation or deletion of the resource on the resource host, such that the change to the resource is identified from a change to a collection hosted by the resource host (e.g., for a collection hosted by the resource host maintains one or more links to respective resources in the IoT network). Also in certain examples, the change to the resource is identified based on an observation of a change to a directory or collection resource, for a directory or collection resource that manages a plurality of resources and devices within the IoT network. With the following techniques an access control entry is established in the access control policy to provide access according to the directory resource. Specifically, the access control policy may be adapted to allow the directory/collection linked resource and host to permit the device hosting the directory/collection to have sufficient access to allow clients of the directory/collection host (e.g., restricted by a second ACE) to perform the intended operation (as supported by the directory/collection) and as represented to the client device or entity.

The flowchart 600 continues with the definition of one or more matching criteria of an access control entry, which is used to define and establish control for the access to the resource (operation 620), relative to one or more subject clients. In an example, the matching criteria comprises a subject matching criterion to determine applicability of the access control entry to the subject client, such that the subject matching criteria identifies the subject client based on identity, role, a wildcard, or a subject resource. For instance, a subject resource may be indicated by an identity certificate containing a resource name used to authenticate the Client (which may allow an ACE subject matching rule to be established that matches the resource name). Also in an example, the matching criteria comprises a resource matching criterion to determine applicability of the access control entry to the resource, such that the resource matching criteria identifies the resource based on a wildcard, a reference, a resource type, an interface, or attributes defined by a link structure (e.g., other attributes defined by an OCF link structure of an OCF Collection resource).

The flowchart 600 continues with the establishing of one or more access control entries that include this matching criteria (operation 630). In an example, the access control entry may specify one or more permissions for the subject client to conduct at least one Representational State Transfer (RESTful) operation, with the RESTful operation providing one or more of: READ, UPDATE, DELETE, or NOTIFY operations.

The flowchart 600 continues with the provision of access information of the created access control entry to a resource host (operation 640). For instance, such operations for dynamic access policy provisioning may be performed by an access management service, and the access management service may cause communication of the access control entry to the resource host, in response to a change to the access control policy. Further, the access control policy may be hosted by the access management service in an access control list, in a scenario where at least a portion of the access control list is communicated from the access management service to the resource host.

In specific examples, the change to the resource is provided by introduction of the resource host as a new device to the IoT network, such that the access management service is notified of the introduction of the new device. For instance, the new device may host one or more resources referenced by an existing resource or collection in the access control policy, such that the new device is provisioned by the access management service with the access control entry to describe an intended access by the existing resource or collection. Also in similar examples, the access management service is notified of when a collection resource overrides or brokers indirect access between a client and a linked device or resource, such that the access control policy that matches a client to a collection resource or that matches a collection host to a linked device or resource represents an override of an access control policy on the linked device or resource that otherwise denies access to the client. In this context, a change a policy hosted by the access management service may be provided that authorizes the overridden access (as this may be a desirable escalation of privilege if brokered through the collection resource host). Accordingly, the access management service may maintain a log or other data tracking of notifications of overridden accesses.

The flowchart 600 concludes with operations to employ the access control, such as where the resource host operates as a server device, and the subject client operates as a client device. For instance, this may occur in a scenario where a request is received for access to the resource via the resource host (operation 650), and access control is implemented using the created or updated access control entry (operation 660), such as established with operations 610-640 discussed above.

In other examples, the operations and functionality described above with reference to FIGS. 3 to 6 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 7:
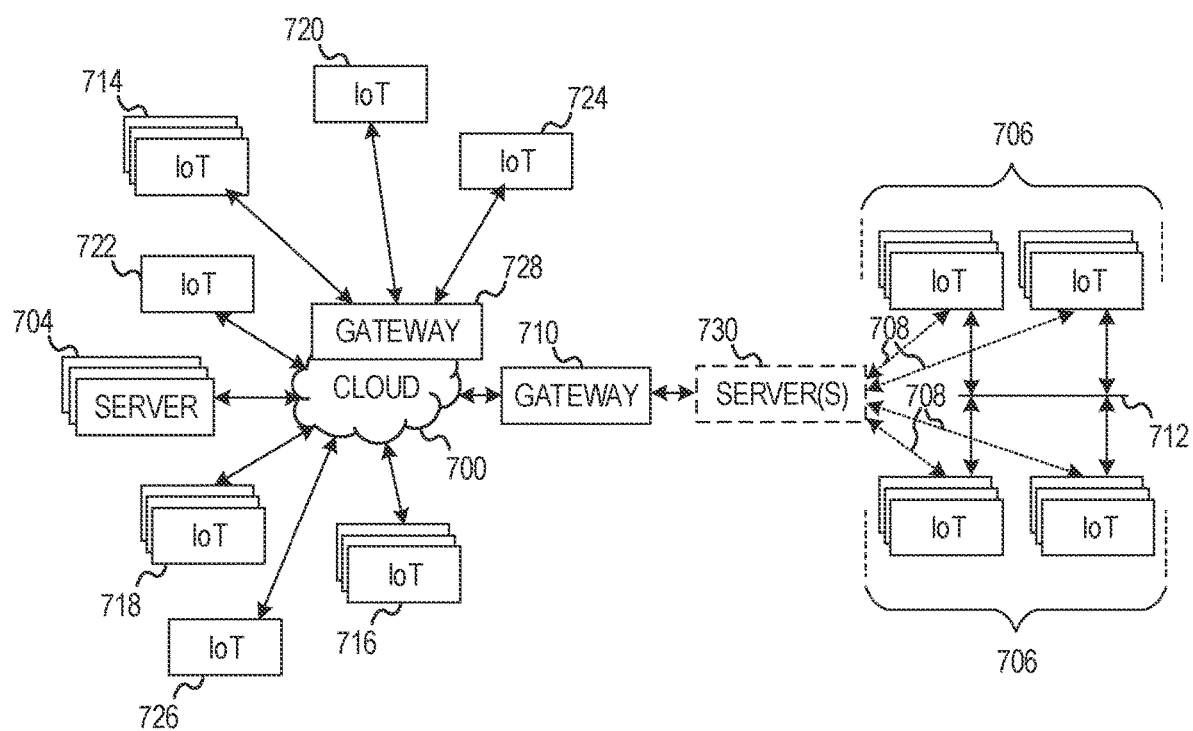
FIG. 7 illustrates a block diagram of a network illustrating communications among a number of IoT devices, according to an example.

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIG. 2), or a combination therein. The groups of IoT devices may be deployed in various residential, commercial, and industrial settings (including in both private or public environments).

As can be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system (e.g., as described above with reference to FIG. 2).

Figure 8:
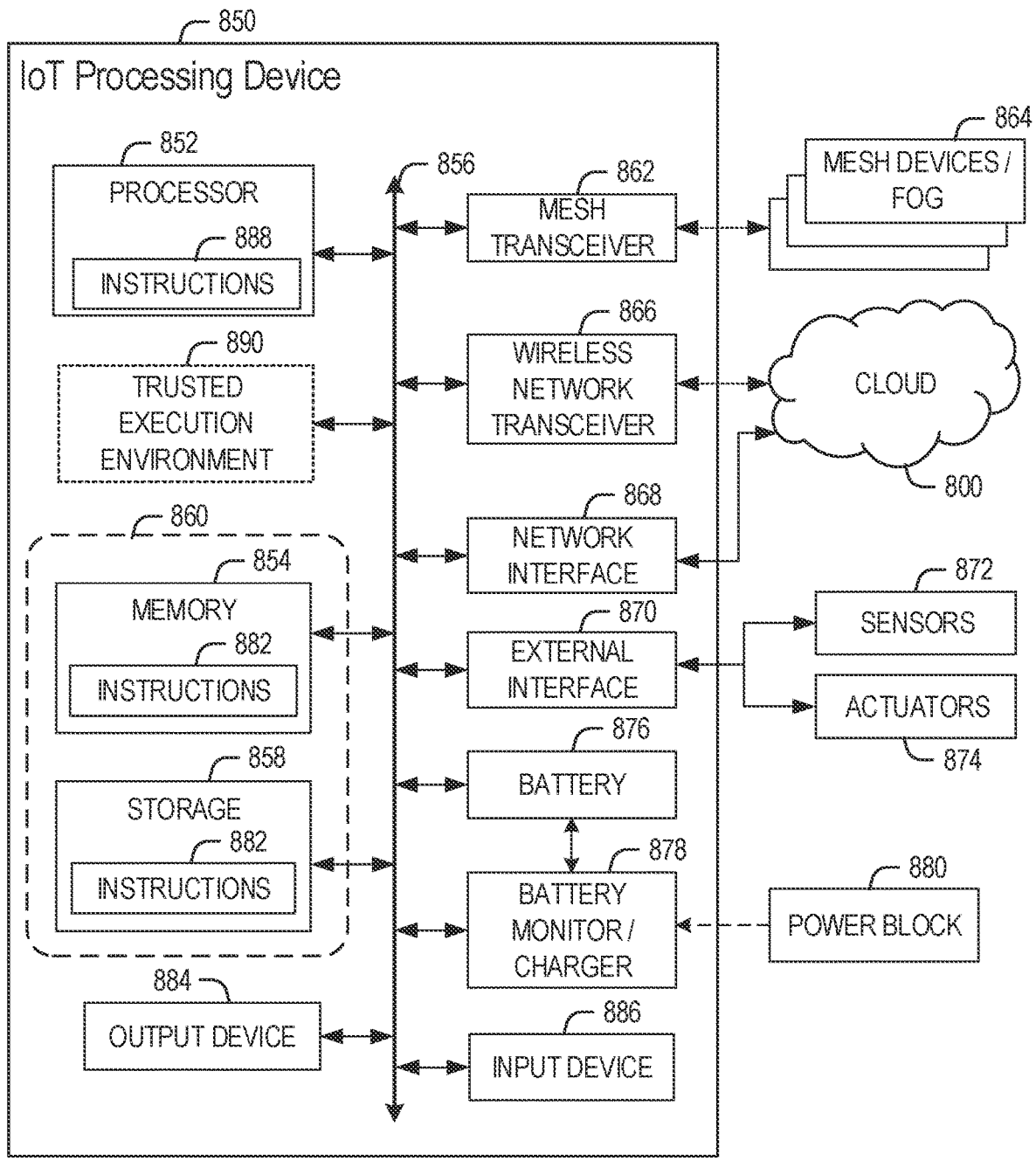
FIG. 8 illustrates a block diagram for an example IoT processing system architecture upon which any one or more of the techniques (e.g., operations, processes, methods, and methodologies) discussed herein may be performed, according to an example.

FIG. 8 is a block diagram for an example IoT processing system architecture, of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee® or other intermediate power radios. Both communications techniques may take place over a single radio at different power levels, or may take place over separate transceivers, for example, a local transceiver using BLE and a separate mesh transceiver using ZigBee®.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-todigital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, California, among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may further include, provide, or invoke instructions 888 to direct the processor 852 to perform a specific sequence or flow of actions, for example, as described with respect to the flowchart(s) and block diagram(s) of operations and functionality depicted above.

In an example, the instructions 888 on the processor 852 (separately, or in combination with the instructions 888 of the machine readable medium 860) may configure execution or operation of a trusted execution environment (TEE) 890. In an example, the TEE 890 operates as a protected area accessible to the processor 852 to enable secure access to data and secure execution of instructions. Various implementations of the TEE 890, and an accompanying secure area in the processor 852 or the memory 854 may be provided, for instance, through use of Intel® Software Guard Extensions (SGX) or ARM® TrustZone® hardware security extensions, Intel Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 9:
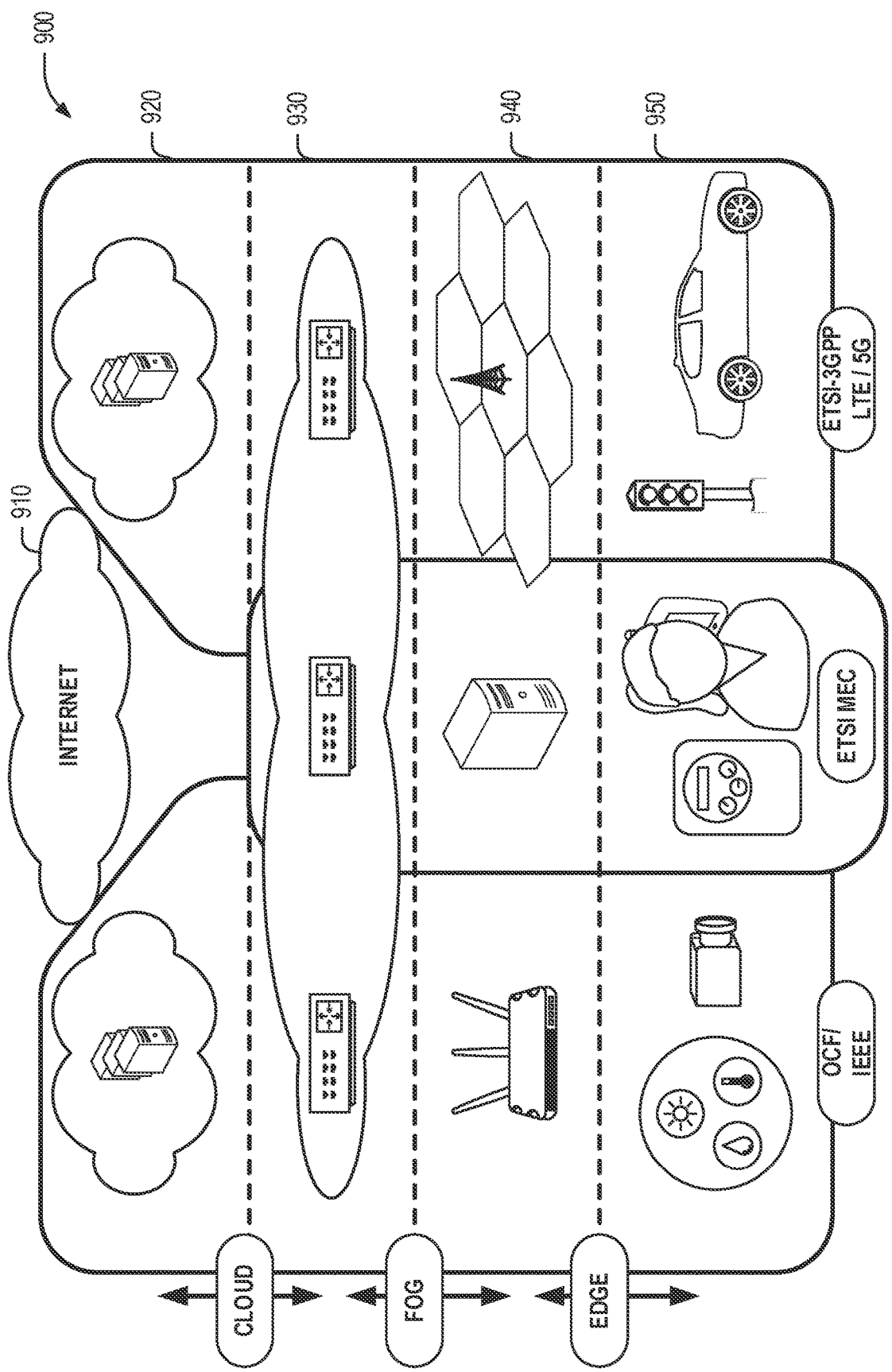
FIG. 9 illustrates a system of networked components, according to an example.

FIG. 9 illustrates a system 900 of networked components in various IoT and infrastructure settings, according to an example. The system 900 may include devices, services, or networks configured to communicate using OCF/IEEE communications standards (e.g., as defined above), ETSI Mobile Edge Computing or Multi-access Edge Computing (MEC) communications standards, or ETSI-3GPP (e.g., LTE, 5G) communications standards. The networked components of system 900 communicate across different levels of network topologies, such as the Internet 910, cloud devices 920, routing devices 930, station/access point/server connection devices 940, and end devices 950.

As further examples of the concepts discussed in FIGS. 1, 2, 7, and 8, above, the various layers and networked components may be generally categorized as cloud (Internet 910, cloud devices 920), fog (routing devices 930, station/access point/server connection devices 940), and edge devices (station/access point/server connection devices 940, end devices 950), although any of the networked components may be set up to operate in any of the layers. A fog network may represent a dense geographical distribution of near-user edge devices (e.g., fog nodes), equipped with storage capabilities (e.g., to avoid the need to store data in cloud data centers), communication capabilities (e.g., rather than routed over the Internet backbone), control capabilities, configuration capabilities, measurement and management capabilities (rather than controlled primarily by network gateways such as those in the LTE core network), among others.

The end devices 950 may include IoT devices or hosts, including vehicles, mobile devices, sensors, or the like. The station/access point/server connection devices 940 may include a wireless access point (e.g., for Wi-Fi), a server or other connection device (which may include a mobile device, such as a phone or a tablet), or a station (e.g., a base station or Node B, such as an enhanced Node B (eNB), according to 3GPP specifications). The routing devices 930 may include a switch, a server, a router, or the like, which may be physical or virtual. The cloud devices 920 may be servers or other devices. The internet 910 may represent other devices or servers not within the system 900.

MEC may encompass an architecture that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by ETSI, such as in the "Mobile Edge Computing Introductory Technical White Paper," published Sep. 1, 2014.

In MEC implementations of the system 900, a device (e.g., a server) may be used as a mobile edge host, such as a localized server (e.g., a street server, embedded in a traffic signal device or system, etc.). Another device in the system 900 may be used as an end device (e.g., a mobile device such as a phone, a laptop, a tablet, an IoT device, a vehicle, etc.). The end device may communicate with the localized server to offload computationally intensive applications or actions such as graphical rendering (e.g., high-speed browsing artificial reality or virtual reality, 3D gaming applications, video processing etc.), intermediate data-processing (e.g., sensor data cleansing, video analysis, etc.), or value-added services (e.g., translation, log analytics, etc.).

An end device may initiate a MEC service for a specific application or action, which may be started on an appropriate MEC host (e.g., the localized server). The application may have a set of requirements (e.g. latency, compute resources, storage resources, location, network capability, security condition etc.) that are fulfilled by the MEC host (e.g., server). The system 900 may select a host fulfilling the requirements (e.g., by using the station/access point/server connection devices 940).

The MEC implementation of system 900 may be used to improve application and service mobility and service continuation among multiple edge computing hosts and groups (such as for automobiles, or user movement within and in/outside of service areas). Application and service customization at the MEC host for network operator-trusted mobile edge applications (e.g., for targeted advertising, enterprise services, group-based content, subscriber content) may be implemented using the system 900.

MEC offers application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments. It will be apparent that the use of devices, services, applications, and resources in this fashion will implicate many aspects of access control and management. Accordingly, dynamic access policy provisioning techniques discussed above with reference to FIGS. 3 to 6 may be performed or coordinated in a MEC implementation. Further, the preceding techniques, although described with reference to OCF examples, may also be equally implemented in a variety of other IoT standards implementations.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: communications circuitry; processing circuitry; and a memory device including instructions embodied thereon, wherein the instructions, which when executed by the processing circuitry, configure the processing circuitry to perform operations for dynamic access policy provisioning, the operations to: observe a change to a resource provided by a resource host, wherein the change to the resource modifies availability to the resource within an Internet of Things (IoT) network; establish an access control entry in an access control policy in response to the observed change to the resource, wherein the access control entry defines one or more matching criteria to control access to the resource for an attempted access from a subject client; and provide, via the communications circuitry, the access control entry to the resource host.

In Example 2, the subject matter of Example 1 includes, wherein the matching criteria comprises a subject matching criterion to determine applicability of the access control entry to the subject client, wherein the subject matching criteria identifies the subject client based on identity, role, a wildcard, or a subject resource.

In Example 3, the subject matter of Examples 1-2 includes, wherein the matching criteria comprises a resource matching criterion to determine applicability of the access control entry to the resource, wherein the resource matching criteria identifies the resource based on a wildcard, a reference, a resource type, an interface, or attributes defined by a link structure.

In Example 4, the subject matter of Examples 1-3 includes, wherein the resource is a hidden resource, and wherein the hidden resource is identified in response to a create, delete, or update command performed with the resource in the IoT network.

In Example 5, the subject matter of Examples 1-4 includes, wherein the observed change to the resource is identified from a change to a hidden resource or collection hosted by the resource host.

In Example 6, the subject matter of Examples 1-5 includes, wherein the observed change to the resource is a creation or deletion of the resource on the resource host, and wherein the change to the resource is identified from a change to a collection hosted by the resource host.

In Example 7, the subject matter of Example 6 includes, wherein the collection hosted by the resource host maintains one or more links to respective resources in the IoT network.

In Example 8, the subject matter of Examples 1-7 includes, wherein the change to the resource is identified in response to operations that observe a change to a directory or collection resource managing a plurality of resources and devices within the IoT network, and wherein the access control entry established in the access control policy is adapted to provide access according to the directory or collection resource.

In Example 9, the subject matter of Examples 1-8 includes, wherein the resource host operates as a server device, and wherein the subject client operates as a client device.

In Example 10, the subject matter of Examples 1-9 includes, wherein the access control entry is provided in a collection of access control entries, wherein the collection of the access control entries are included in access control list of a host, wherein the respective access control entries define permissions and subjects for respective links between devices and resources.

In Example 11, the subject matter of Examples 1-10 includes, wherein the access control entry specifies a permission for the subject client to conduct at least one Representational State Transfer (RESTful) operation, the RESTful operation providing one or more of: READ, UPDATE, DELETE, or NOTIFY operations.

In Example 12, the subject matter of Examples 1-11 includes, wherein the operations for dynamic access policy provisioning are performed by an access management service.

In Example 13, the subject matter of Example 12 includes, wherein the change to the resource is provided by introduction of the resource host as a new device to the IoT network, wherein the access management service is notified of the introduction of the new device.

In Example 14, the subject matter of Example 13 includes, wherein the new device hosts one or more resources referenced by an existing resource or collection in the access control policy, and wherein the new device is provisioned with the access control entry to describe an intended access by the existing resource or collection.

In Example 15, the subject matter of Examples 12-14 includes, wherein the access management service is adapted to provide, via the communications circuitry, the access control entry to the resource host, in response to a change to the access control policy.

In Example 16, the subject matter of Example 15 includes, wherein the access control policy is hosted by the access management service in an access control list, and wherein at least a portion of the access control list is communicated from the access management service to the resource host.

In Example 17, the subject matter of Examples 12-16 includes, wherein the access management service is notified of when a collection resource overrides or brokers indirect access between a client and a linked device or resource, wherein the access control policy that matches a client to a collection resource or that matches a collection host to a linked device or resource represents an override of an access control policy on the linked device or resource that otherwise denies access to the client.

In Example 18, the subject matter of Examples 1-17 includes, wherein network communications used to perform the operations comprise Representational State Transfer (RESTful) interactions among one or more Internet of Things (IoT) network topologies, and wherein the network communications are conducted according to one or more Open Connectivity Foundation (OCF) specifications.

Example 19 is a method, comprising a plurality of operations executed with a processor and memory of a device, to implement dynamic access policy provisioning, with operations comprising: observing a change to a resource provided by a resource host, wherein the change to the resource modifies availability to the resource within an Internet of Things (IoT) network; establishing an access control entry in an access control policy in response to the observed change to the resource, wherein the access control entry defines one or more matching criteria to control access to the resource for an attempted access from a subject client; and communicating the access control entry to the resource host, to implement the access control policy at the resource host for subsequent occurrences of the attempted access to the resource.

In Example 20, the subject matter of Example 19 includes, wherein the matching criteria comprises a subject matching criterion to determine applicability of the access control entry to the subject client, wherein the subject matching criteria identifies the subject client based on identity, role, a wildcard, or a subject resource.

In Example 21, the subject matter of Examples 19-20 includes, wherein the matching criteria comprises a resource matching criterion to determine applicability of the access control entry to the resource, wherein the resource matching criteria identifies the resource based on a wildcard, a reference, a resource type, an interface, or attributes defined by a link structure.

In Example 22, the subject matter of Examples 19-21 includes, wherein the resource is a hidden resource, and wherein the hidden resource is identified in response to a create, delete, or update command performed with the resource in the IoT network.

In Example 23, the subject matter of Examples 19-22 includes, wherein the observed change to the resource is identified from a change to a hidden resource or collection hosted by the resource host.

In Example 24, the subject matter of Examples 19-23 includes, wherein the observed change to the resource is a creation or deletion of the resource on the resource host, and wherein the change to the resource is identified from a change to a collection hosted by the resource host.

In Example 25, the subject matter of Example 24 includes, wherein the collection hosted by the resource host maintains one or more links to respective resources in the IoT network.

In Example 26, the subject matter of Examples 19-25 includes, wherein the change to the resource is identified in response to operations that observe a change to a directory or collection resource managing a plurality of resources and devices within the IoT network, and wherein the access control entry established in the access control policy is adapted to provide access according to the directory resource.

In Example 27, the subject matter of Examples 19-26 includes, wherein the resource host operates as a server device, and wherein the subject client operates as a client device.

In Example 28, the subject matter of Examples 19-27 includes, wherein the access control entry is provided in a collection of access control entries, wherein the collection of the access control entries are included in access control list of a host, wherein the respective access control entries define permissions and subjects for respective links between devices and resources.

In Example 29, the subject matter of Examples 19-28 includes, wherein the access control entry specifies a permission for the subject client to conduct at least one Representational State Transfer (RESTful) operation, the RESTful operation providing one or more of: READ, UPDATE, DELETE, or NOTIFY operations.

In Example 30, the subject matter of Examples 19-29 includes, wherein the operations for dynamic access policy provisioning are performed by an access management service.

In Example 31, the subject matter of Example 30 includes, wherein the change to the resource is provided by introduction of the resource host as a new device to the IoT network, wherein the access management service is notified of the introduction of the new device.

In Example 32, the subject matter of Example 31 includes, wherein the new device hosts one or more resources referenced by an existing resource or collection in the access control policy, and wherein the new device is provisioned with the access control entry to describe an intended access by the existing resource or collection.

In Example 33, the subject matter of Examples 30-32 includes, wherein the access management service is adapted to cause communication of the access control entry to the resource host, in response to a change to the access control policy.

In Example 34, the subject matter of Example 33 includes, wherein the access control policy is hosted by the access management service in an access control list, and wherein at least a portion of the access control list is communicated from the access management service to the resource host.

In Example 35, the subject matter of Examples 30-34 includes, wherein the access management service is notified of when a collection resource overrides or brokers indirect access between a client and a linked device or resource, wherein the access control policy that matches a client to a collection resource or that matches a collection host to a linked device or resource represents an override of an access control policy on the linked device or resource that otherwise denies access to the client.

In Example 36, the subject matter of Examples 19-35 includes, wherein network communications used to perform the operations comprise Representational State Transfer (RESTful) interactions among one or more Internet of Things (IoT) network topologies, and wherein the network communications are conducted according to one or more Open Connectivity Foundation (OCF) specifications.

Example 37 is a device-readable storage medium including instructions, wherein the instructions, when executed by a processing circuitry of a device, cause the processing circuitry to perform operations of any of Examples 19 to 36.

Example 38 is an apparatus comprising means for performing any of the methods of Examples 19 to 36.

Example 39 is a system, comprising: an access management service device, comprising: processing circuitry; and a storage medium including instructions embodied thereon, wherein the instructions, which when executed by the processing circuitry, configure the processing circuitry to perform operations for dynamic access policy provisioning, the operations to: observe an addition, deletion, or change to a resource provided by a resource host within an Internet of Things (IoT) network; establish an access control entry in an access control policy in response to the observed change to the resource, wherein the access control entry defines one or more matching criteria to control access to the resource for an attempted access from a subject client; and cause the access control entry to be provided to the resource host.

In Example 40, the subject matter of Example 39 includes, the resource host, the resource host configured to operate as a server device in the IoT network.

In Example 41, the subject matter of Examples 39-40 includes, the subject client, the subject client configured to operate as a client device in the IoT network.

In Example 42, the subject matter of Examples 39-41 includes, a data store to host the access control entry in a collection of access control entries, wherein the collection of the access control entries are communicated to an access control list of a host, and wherein the respective access control entries define permissions and subjects for respective links between devices and resources in the IoT network.

Example 43 is an apparatus, comprising: means for observing a change to a resource provided by a resource host, wherein the change to the resource modifies availability to the resource within an Internet of Things (IoT) network; means for establishing an access control entry in an access control policy in response to the observed change to the resource, wherein the access control entry defines one or more matching criteria to control access to the resource for an attempted access from a subject client; and means for communicating the access control entry to the resource host, to implement the access control policy at the resource host for subsequent occurrences of the attempted access to the resource.

In Example 44, the subject matter of Example 43 includes, means for generating the matching criteria, to provide a subject matching criterion to determine applicability of the access control entry to the subject client, wherein the subject matching criteria identifies the subject client based on identity, role, a wildcard, or a subject resource.

In Example 45, the subject matter of Examples 43-44 includes, means for generating the matching criteria, to provide a resource matching criterion to determine applicability of the access control entry to the resource, wherein the resource matching criteria identifies the resource based on a wildcard, a reference, a resource type, an interface, or attributes defined by a link structure.

In Example 46, the subject matter of Examples 43-45 includes, means for identifying the resource as a hidden resource, wherein the hidden resource is identified in response to a create, delete, or update command performed with the resource in the IoT network.

In Example 47, the subject matter of Examples 43-46 includes, means for identifying the observed change to the resource from a change to a hidden resource or collection hosted by the resource host.

In Example 48, the subject matter of Examples 43-47 includes, means for observing the change to the resource from a creation or deletion of the resource on the resource host, wherein the change to the resource is identified from a change to a collection hosted by the resource host.

In Example 49, the subject matter of Example 48 includes, means for modifying the collection hosted by the resource host, wherein the collection maintains one or more links to respective resources in the IoT network.

In Example 50, the subject matter of Examples 43-49 includes, means for identifying the change to the resource in response to operations that observe a change to a directory or collection resource managing a plurality of resources and devices within the IoT network, wherein the access control entry established in the access control policy is adapted to provide access according to the directory resource.

In Example 51, the subject matter of Examples 43-50 includes, means for generating the access control entry for a collection of access control entries, wherein the collection of the access control entries are included in access control list of a host, and wherein the respective access control entries define permissions and subjects for respective links between devices and resources.

In Example 52, the subject matter of Examples 43-51 includes, means for generating the access control entry to specify a permission for the subject client to conduct at least one Representational State Transfer (RESTful) operation, the RESTful operation providing one or more of: READ, UPDATE, DELETE, or NOTIFY operations.

In Example 53, the subject matter of Examples 43-52 includes, means for controlling the operations for dynamic access policy provisioning in an access management service.

In Example 54, the subject matter of Example 53 includes, means for detecting the change to the resource by introduction of the resource host as a new device to the IoT network, wherein the access management service is notified of the introduction of the new device.

In Example 55, the subject matter of Example 54 includes, means for provisioning the new device with the access control entry to describe an intended access by an existing resource or collection, wherein the new device hosts one or more resources referenced by the existing resource or collection in the access control policy.

In Example 56, the subject matter of Examples 53-55 includes, means for communicating the access control entry to the resource host, in response to a change to the access control policy.

In Example 57, the subject matter of Example 56 includes, means for hosting the access control policy in an access control list; and means for communicating at least a portion of the access control list to the resource host.

In Example 58, the subject matter of Examples 53-57 includes, means for notifying the access management service when a collection resource overrides or brokers indirect access between a client and a linked device or resource, wherein the access control policy that matches a client to a collection resource or that matches a collection host to a linked device or resource represents an override of an access control policy on the linked device or resource that otherwise denies access to the client.

In Example 59, the subject matter of Examples 43-58 includes, means for conducting network communications to observe the change and to establish and communicate the access control entry, using Representational State Transfer (RESTful) interactions among one or more Internet of Things (IoT) network topologies, wherein the network communications are conducted according to one or more Open Connectivity Foundation (OCF) specifications.

Example 60 is a device fog, cloud, system, or network arrangement operating as a domain, comprising respective devices adapted to perform the operations of any of Examples 1 to 59.

Example 61 is a cloud service server adapted to perform the operations of a cloud service invoked by any of Examples 1 to 59.

Example 62 is an edge computing device adapted to perform the operations of a client device invoked by any of Examples 1 to 59.

Example 63 is an onboarding tool adapted to perform operations of access management and provisioning invoked by any of Examples 1 to 59.

Example 64 is an authentication management service server adapted to perform operations of authentication, access management, and provisioning, invoked by any of Examples 1 to 59.

Example 65 is a device onboarding service server adapted to perform operations of onboarding, provisioning, or control invoked by any of Examples 1 to 59.

Example 66 is an Open Connectivity Foundation (OCF) device, configured as a server, client, or intermediary according to an OCF specification, comprising means to implement the operations of any of Examples 1 to 59.

Example 67 is an Internet of Things (IoT) network topology, the IoT network topology comprising respective communication links adapted to perform communications for the operations of any of Examples 1 to 59.

Example 68 is a network comprising respective devices and device communication mediums for performing any of the operations of Examples 1 to 59.

Example 69 is an apparatus comprising means for performing any of the operations of Examples 1 to 59.

Example 70 is a system to perform the operations of any of Examples 1 to 59.

Example 71 is a method to perform the operations of any of Examples 1 to 59.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus comprising:
   memory; and
   machine executable instructions; and
   programmable circuitry to at least one of instantiate or execute the machine executable instructions to at least:
      identify a creation of a resource based on a first specific command output by a resource host and observed on an Internet of things (IoT) network, the first specific command performed with a device to create the resource, the resource not accessible on the IoT network, the identification of the creation based on a change to (a) a directory or (b) collection resource managing a plurality of resources and devices within the IoT network based on the creation of the resource;
      generate a first access control entry based on the creation, the first access control entry to include matching criteria corresponding to access to the resource by a subject client, the first access control entry to provide access to the resource according to the directory or the collection resource;
      identify a deletion of the resource that is not accessible on the IoT network, the deletion identified based on a second specific command output by the resource host and observed on the IoT network, the second specific command referencing the resource;

generate a second access control entry based on the deletion; and cause transmission of the second access control entry to the resource host.

2. The apparatus of claim 1, wherein the first specific command is a create command.

3. The apparatus of claim 1, wherein the programmable circuitry is to identify the change in response to a notification.

4. The apparatus of claim 1, wherein the change is an anticipated change.

5. The apparatus of claim 1, wherein the resource is in a collection hosted by the resource host.

6. The apparatus of claim 5, wherein the collection includes one or more links to respective resources of the IoT network.

7. The apparatus of claim 1, wherein the matching criteria includes at least one of (a) a subject matching criterion corresponding to a first applicability of the first access control entry to the subject client or (b) a resource matching criterion corresponding to a second applicability of the first access control entry to the resource, the subject matching criterion identifying the subject client based on at least one of identity, role, a first wildcard, or a subject resource, the resource matching criterion identifying the resource based on at least one of a second wildcard, a reference, a resource type, an interface, or attributes defined by a link structure.

8. The apparatus of claim 1, wherein the programmable circuitry is unaware of the resource prior to the observation of the first specific command on the IoT network.

9. The apparatus of claim 1, wherein the first specific command does not identify the programmable circuitry.

10. The apparatus of claim 1, wherein the first specific command does not identify the programmable circuitry.

11. The apparatus of claim 1, wherein the resource is a hidden resource.

12. A non-transitory computer readable storage medium comprising instructions to cause one or more processors to at least:

identify a creation of a resource based on a first specific command output by a resource host and observed on an Internet of things (IoT) network, the first specific command performed with a device to create the resource, the resource not accessible on the IoT network, the identification of the creation based on a change to (a) a directory or (b) collection resource managing a plurality of resources and devices within the IoT network based on the creation of the resource;

generate a first access control entry based on the creation, the first access control entry to include matching criteria corresponding to access to the resource by a subject client, the first access control entry to provide access to the resource according to the directory or the collection resource;

identify a change to the resource that is not accessible on the IoT network, the change identified based on a second specific command output by the resource host and observed on the IoT network, the second specific command referencing the resource;

generate a second access control entry based on the identified change; and cause transmission of the second access control entry to the resource host.

13. The non-transitory computer readable storage medium of claim 12, wherein the first specific command is a create command.

14. The non-transitory computer readable storage medium of claim 12, wherein the instructions cause the one or more processors to identify the change in response to a notification.

15. The non-transitory computer readable storage medium of claim 12, wherein the change is an anticipated change.

16. The non-transitory computer readable storage medium of claim 12, wherein the change to the resource corresponds to at least one of a change, an update, or a deletion of the resource in a collection hosted by the resource host.

17. The non-transitory computer readable storage medium of claim 16, wherein the collection includes one or more links to respective resources of the IoT network.

18. The non-transitory computer readable storage medium of claim 12, wherein the matching criteria includes at least one of (a) a subject matching criterion corresponding to a first applicability of the first access control entry to the subject client or (b) a resource matching criterion corresponding to a second applicability of the first access control entry to the resource, the subject matching criterion identifying the subject client based on at least one of identity, role, a first wildcard, or a subject resource, the resource matching criterion identifying the resource based on at least one of a second wildcard, a reference, a resource type, an interface, or attributes defined by a link structure.

19. The non-transitory computer readable storage medium of claim 12, wherein the resource is a hidden resource.

20. A method comprising:

identifying, by executing an instruction with one or more processors, a creation of a resource based on a first specific command output by a resource host and observed on an Internet of things (IoT) network, the first specific command performed with a device to create the resource, the resource not accessible on the IoT network, the identification of the creation based on a change to (a) a directory or (b) collection resource managing a plurality of resources and devices within the IoT network based on the creation of the resource;

generate a first access control entry based on the creation, the first access control entry to include matching criteria corresponding to access to the resource by a subject client, the first access control entry to provide access to the resource according to the directory or the collection resource;

identifying, by executing an instruction with the one or more processors, an update of the resource that is not accessible on the IoT network, the update identified based on a second specific command output by the resource host and observed on the IoT network, the second specific command referencing the resource;

generating, by executing an instruction with the one or more processors, a second access control entry based on the update; and transmitting the second access control entry to the resource host.

21. The method of claim 20, wherein the first specific command is a create command.

22. The method of claim 20, further including identifying the change in response to a notification.

23. The method of claim 20, wherein the change is an anticipated change.

24. The method of claim 20, wherein the update to the resource corresponds to at least one of a change or a deletion of the resource in a collection hosted by the resource host.

25. The method of claim 20, wherein the matching criteria includes at least one of (a) a subject matching criterion corresponding to a first applicability of the first access control entry to the subject client or (b) a resource matching criterion corresponding to a second applicability of the first access control entry to the resource, the subject matching criterion identifying the subject client based on at least one of identity, role, a first wildcard, or a subject resource, the resource matching criterion identifying the resource based on at least one of a second wildcard, a reference, a resource type, an interface, or attributes defined by a link structure.

* * * * *